United States Patent
Van Acht (10) Patent No.: US 12,250,477 B2
(45) Date of Patent: Mar. 11, 2025

(54) IMAGE SENSING SYSTEM

(71) Applicant: KONINKLIJKE PHILIPS N.V., Eindhoven (NL)

(72) Inventor: Victor Martinus Gerardus Van Acht, Veldhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 84 days.

(21) Appl. No.: 18/266,000

(22) PCT Filed: Dec. 9, 2021

(86) PCT No.: PCT/EP2021/084874
§ 371 (c)(1),
(2) Date: Jun. 8, 2023

(87) PCT Pub. No.: WO2022/128702
PCT Pub. Date: Jun. 23, 2022

(65) Prior Publication Data
US 2024/0040275 A1 Feb. 1, 2024

(30) Foreign Application Priority Data
Dec. 15, 2020 (EP) ..................... 20214053

(51) Int. Cl.
*H04N 25/531* (2023.01)
*H04N 23/10* (2023.01)

(52) U.S. Cl.
CPC ......... *H04N 25/531* (2023.01); *H04N 23/125* (2023.01); *H04N 2209/044* (2013.01)

(58) Field of Classification Search
CPC ............. H04N 2209/044; H04N 23/12; H04N 23/125; H04N 23/16; H04N 25/135; H04N 25/531
See application file for complete search history.

(56) References Cited

U.S. PATENT DOCUMENTS 7,129,983 B2 10/2006 Rantanen et al.
8,045,001 B2 10/2011 Nakao et al.
(Continued)

FOREIGN PATENT DOCUMENTS

CN 202918392 U 5/2013
EP 1263215 A2 12/2002
(Continued)

OTHER PUBLICATIONS

Wilburn, "High Performance Imaging Using Arrays of Inexpensive Cameras", Dec. 2004, pp. 1-128, Copyright by Bennett Wilburn 2005.
(Continued)

*Primary Examiner* — Amy R Hsu (57) ABSTRACT

According to an aspect, there is provided an image sensing system comprising: a rolling shutter image sensor comprising an array of pixels in a frame arranged into a plurality of image lines extending along a width direction, and distributed in a scanning direction which is perpendicular to the width direction, wherein the rolling shutter image sensor is configured to scan the frame by sequentially scanning each image line along the scanning direction, wherein scanning each image line includes making the pixels in each image line sensitive to light for a predetermined exposure time, and then determining an intensity readout for each pixel of the respective image line; a lens system configured to project at least two similar outgoing images of an object onto the image sensor, the outgoing images offset from one another in the scanning direction, wherein the outgoing images are projected onto the image sensor such that each pixel of an outgoing image corresponding to a position on the object matches a pixel or group of pixels of another outgoing image corresponding to the respective position on the object; a light generator configured to generate at least two different colours of light, defined by different wavelengths, to illu-
(Continued)

minate the object; a timing module configured to control the light generator to sequentially generate at least two different colours of light during scanning of a single frame; and a processor configured to identify matched pixels of different outgoing images corresponding to a respective position on the object, and to resolve the colour spectrum of the respective position of the object based on the intensity readout of each matched pixel and the colours of light that the respective matched pixels were exposed to while they were sensitive.

13 Claims, 6 Drawing Sheets

(56) References Cited

U.S. PATENT DOCUMENTS

| | | | |
|---|---|---|---|
| 2007/0147811 A1 | 6/2007 | Nakao et al. | |
| 2008/0177185 A1 | 7/2008 | Nakao et al. | |
| 2012/0314100 A1* | 12/2012 | Frank | H04N 23/741 |
| | | | 348/229.1 |
| 2016/0105648 A1* | 4/2016 | Eline | H04N 25/531 |
| | | | 348/144 |
| 2017/0223286 A1* | 8/2017 | Laroia | H04N 23/69 |
| 2017/0299435 A1* | 10/2017 | Rhoads | H04N 23/56 |
| 2018/0086266 A1* | 3/2018 | Yamaguchi | H04N 7/185 |
| 2018/0252583 A1 | 9/2018 | Schleyen et al. | |

FOREIGN PATENT DOCUMENTS

| | | |
|---|---|---|
| JP | 2007174566 A | 7/2007 |
| WO | 2013109934 A1 | 7/2013 |
| WO | 2022033987 A1 | 2/2022 |

OTHER PUBLICATIONS https://www.vfx.co.nz/general-2/the-matrix-bullet-time/, downloaded Jun. 7, 2023.

Steger, "A Comprehensive and Versatile Camera Model for Cameras with Tilt Lenses International Journal of Computer Vision", vol. 123 Issue 2, pp. 121-159, 2017.

International Search report and Written Opinion of PCT/EP2021/084874, dated Apr. 4, 2022.

* cited by examiner

IMAGE SENSING SYSTEM

CROSS-REFERENCE TO PRIOR APPLICATIONS

This application is the U.S. National Phase application under 35 U.S.C. § 371 of International Application No. PCT/EP2021/084874, filed on Dec. 9, 2021, which claims the benefit of European Patent Application No. 20214053.9, filed on Dec. 15, 2020. These applications are hereby incorporated by reference herein.

FIELD OF THE INVENTION

The present application relates to an image sensing system for determining the colour of an object, and a method for determining the colour of an object.

BACKGROUND OF THE INVENTION

Multispectral imaging involves making an image with more spectral resolution (i.e. colours) than the three colours that the human eye can distinguish (red, green, and blue). Generally, making an image with colour involves the use of image sensor which can sense more than one colour. However, colour sensors are more expensive than black and white image sensors, and sensors which can sense more than 3 colours are yet more expensive and difficult to make.

US2008/0177185 discloses a skin area detection imaging device for detecting a skin area of a human body as an object comprises: two optical lenses to form two unit images on an imaging element by collecting light from the object illuminated by near-infrared light; a rolling shutter for sequentially reading the unit images; and two LEDs for emitting lights with different wavelengths (850 nm and 940 nm) in the near-infrared range. A microprocessor switches on the two LEDs when reading the two unit images, respectively. The skin area of one read unit image is displayed with brightness different from that of the other unit image based on difference in reflectance to various wavelengths of near-infrared light. The microprocessor compares the two unit images to determine, as a skin area, an area having difference in brightness larger than a predetermined value. This makes it possible to detect the skin area in a short time.

SUMMARY OF THE INVENTION

According to a first aspect, there is provided an image sensing system comprising: a rolling shutter image sensor comprising an array of pixels in a frame arranged into a plurality of image lines extending along a width direction, and distributed in a scanning direction which is perpendicular to the width direction, wherein the rolling shutter image sensor is configured to scan the frame by sequentially scanning each image line along the scanning direction, wherein scanning each image line includes making the pixels in each image line sensitive to light for a predetermined exposure time, and then determining an intensity readout for each pixel of the respective image line; a lens system configured to project at least two similar outgoing images of an object onto the image sensor, the outgoing images offset from one another in the scanning direction, wherein the outgoing images are projected onto the image sensor such that each pixel of an outgoing image corresponding to a position on the object matches a pixel or group of pixels of another outgoing image corresponding to the respective position on the object; a light generator configured to generate at least two different colours of light, defined by different wavelengths, to illuminate the object; a timing module configured to control the light generator to sequentially generate at least two different colours of light during scanning of a single frame; and a processor configured to identify matched pixels of different outgoing images corresponding to a respective position on the object, and to resolve the colour spectrum of the respective position of the object based on the intensity readout of each matched pixel and the colours of light that the respective matched pixels were exposed to while they were sensitive.

At least two of the outgoing images may be projected onto the image sensor in identical size.

The matched pixels may be predetermined based on the lens system, or could be calculated in real-time by processing the outgoing images and comparing the pixels from one outgoing image to the pixels of another outgoing image to determined matched pixels.

The lens system may be configured to project an array of outgoing images onto the image sensor having at least two distinct columns of outgoing images. The columns may be distributed along the width direction, each column comprising at least two outgoing images distributed in the scanning direction, wherein each outgoing image may be offset in the scanning direction from all other outgoing images.

An outgoing image in a column may be split across the frame such that a top portion of one outgoing image is projected on the bottom of the image sensor and a remaining bottom portion of another outgoing image is projected on the top of the image sensor in the same column, wherein the top portion and the bottom portion together define a single whole outgoing image.

The exposure time of each image line may be equal to the time taken to read out the number of image lines across which each outgoing image spans.

The timing module may be configured to control the light generator to generate different colours of light at intervals, such that the light generator may be controlled to generate at least two different colours of light during the intensity readout of image lines of at least one of the outgoing images in a frame.

The light generator may be configured to sequentially generate the different colours of light in cycles, each cycle may be generated within a frame and may comprise generation of the different colours of light in a predetermined sequence. Each subsequent cycle may have the same sequence as a preceding cycle but begins with the second colour of light of the preceding cycle and ends with the first colour of light of the preceding cycle.

The timing module may be configured to control the light generator to generate light at intervals, such that there are as many intervals during the scanning of each outgoing image as there are columns of outgoing images projected onto the image sensor.

The light generator may be configured to generate up to as many colours as there are intervals of light generation in a frame. The intervals may be regular intervals.

The light generator may be configured to produce flashes of light or to produce a continuous emission of light.

The processor may be configured, for readout of each and every pixel, to resolve the colour spectrum of the respective position of the object based on the intensity readout of the respective pixel and at least one preceding matched pixel.

According to a second aspect, there is provided a method of resolving the colour of an object with a rolling shutter image sensor comprising an array of pixels in a frame arranged into a plurality of image lines extending along a width direction, and distributed in a scanning direction which is perpendicular to the width direction, wherein the rolling shutter image sensor is configured to scan the frame by sequentially scanning each image line along the scanning direction, wherein scanning each image line includes making the pixels in each image line sensitive to light for a predetermined exposure time, and then determining an intensity readout for each pixel of the respective image line, the method comprising: projecting at least two similar outgoing images onto the image sensor offset from one another along the scanning direction, wherein each pixel of an outgoing image corresponding to a position on the object matches a pixel or a group of pixels of another outgoing image corresponding to the respective position on the object; sequentially generating at least two different colours of light, defined by different wavelengths, to illuminate the object during scanning of the frame of the image sensor, identifying matched pixels of different outgoing images corresponding to a respective position on the objection, and resolving the colour spectrum of the respective position of the object based on the intensity readout of each matched pixel in the outgoing image and the colours of light that the respective matched pixels were exposed to while they were sensitive.

The method may be a computer implemented method.

The method may comprise projecting an array of outgoing images onto the image sensor in at least two distinct columns of outgoing images. The columns may be distributed along the width direction, each column comprising at least two outgoing images distributed in the scanning direction, wherein each of the outgoing images may be offset from all other outgoing images in the scanning direction.

The exposure time may be equal to the time taken to readout the number of image lines across which each outgoing image spans.

Different colours of light may be generated at intervals, such that at least two different colours of light are generated during the intensity readout of image lines of at least one of the outgoing images in a frame.

Different colours of light may be generated sequentially in cycles. Each cycle may be generated within a frame and may comprise generation of the different colours of light in a predetermined sequence. Each subsequent cycle may have the same sequence as a preceding cycle but begin with a second colour of light of the preceding cycle and ends with a first colour of light of the preceding cycle.

Different colours of light may be generated at intervals, such that there are as many intervals during scanning of each outgoing image, as there are columns of outgoing images projected onto the image sensor.

Generating light may include generating a flash of light or generating a continuous light.

The projections of the at least two outgoing images on the rolling shutter image sensor may have no overlapping parts (i.e. different outgoing images may not occupy the same space on the image sensor).

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
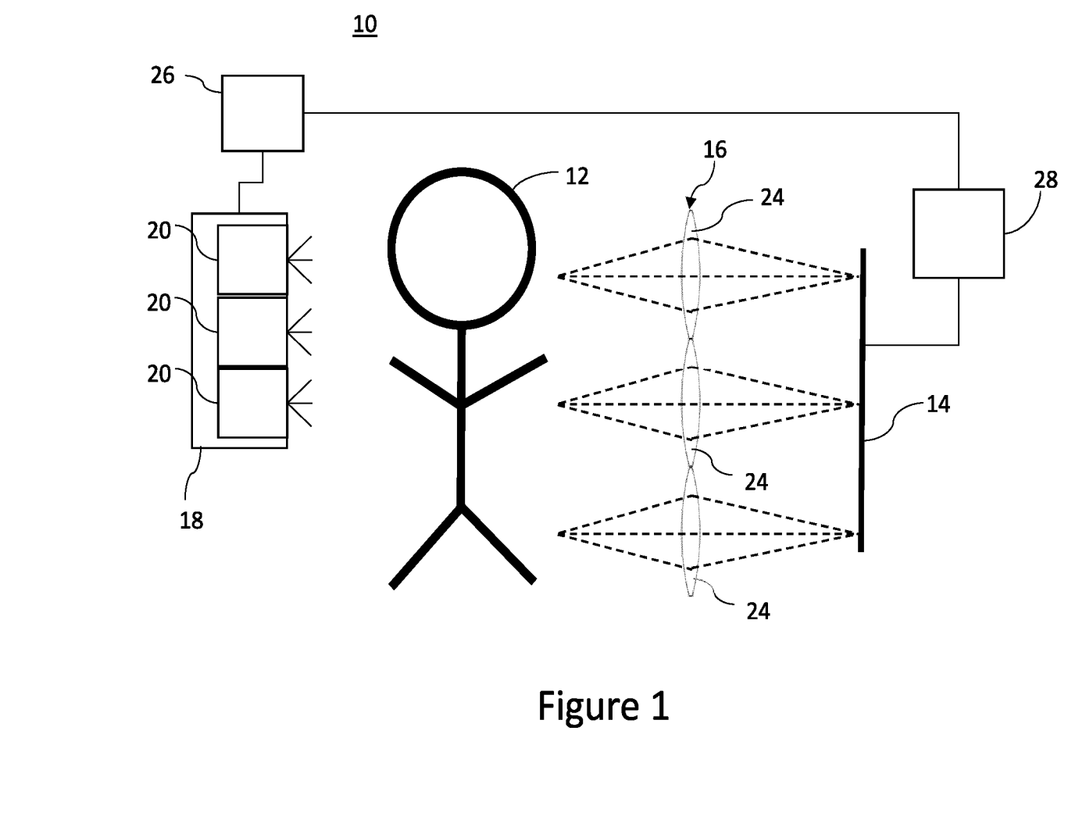
FIG. 1 schematically shows an example image sensing system.

FIG. 1 shows an image sensing system 10 in use to sense an image of an object 12.

The image sensing system 10 comprises a rolling shutter image sensor 14 and a lens system 16 configured to project three similar outgoing images of the object 12 onto the image sensor 14. In some examples, the lens system may be configured to project two or more than three similar outgoing images of the object onto the image sensor.

The lens system 16 in this example comprises three lenses 24 which are disposed adjacent one another, in front of the image sensor 14. The lens system 16 is therefore arranged to be disposed between the object 12 to be imaged and the image sensor 14.

In other examples, the lens system may comprise a lens and one or more beam splitters, with the beam splitters disposed between the lens and the images sensor, such that the beam splitters are configured to split beams from the lens to project two or more identical images onto the image sensor.

Projecting two or more outgoing images onto a single image sensor 14 effectively increases the frame rate of the image sensor 14, albeit with a reduced resolution of each image. In this example, since three outgoing images are projected onto the image sensor, the frame rate is effectively tripled compared to normal use of an image sensor. If there are two images projected onto a single image sensor, the frame rate of the image sensor is effectively doubled.

The image sensing system 10 comprises a light generator 18 which, in this example, is configured to generate three different colours of light to illuminate the object 12. In this example, the light generator 18 comprises three lights 20 which are configured to generate flashes of light at different wavelengths (i.e. different colours of light). In other examples, the light generator may be configured to generate two different colours of light with two lights or more than three different colours of light. In further examples, the lights may be configured to generate continuous light, back to back, as opposed to flashes. It will be appreciated that generating different colours of light can also be achieved with only one light, together with a plurality of different colour filters.

Figure 2:
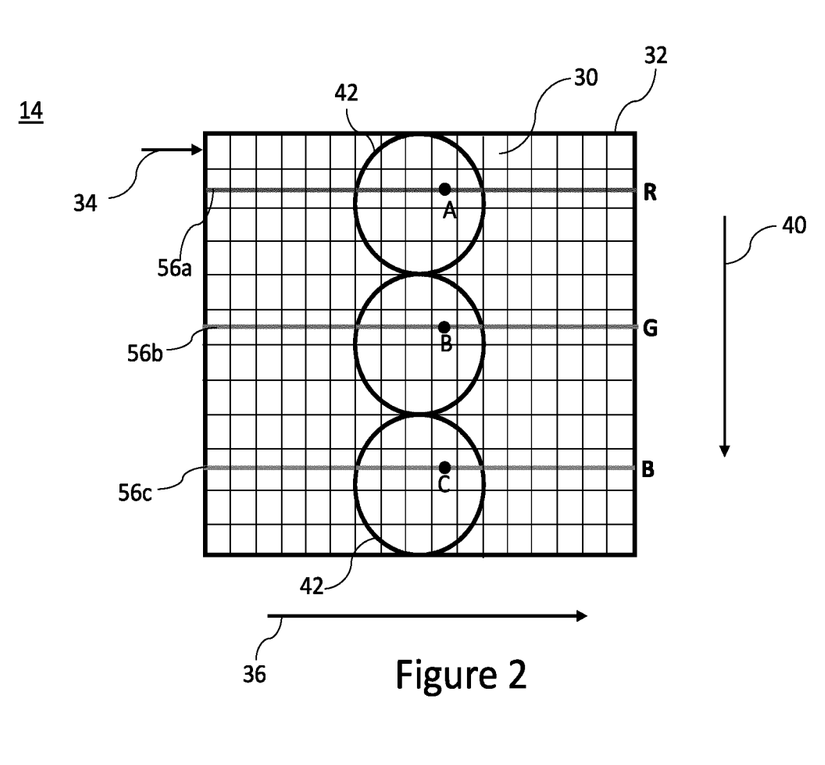
FIG. 2 schematically shows a roller shutter image sensor with images projected onto it in a first example.

FIG. 2 shows the rolling shutter image sensor 14 comprising an array of pixels 30 in a frame 32 arranged into image lines 34 extending along a width direction 36, and distributed in a scanning direction 40 which is perpendicular to the width direction 36.

In this example in FIG. 2, the lens system 16 is configured to project three outgoing images 42 onto the image sensor 14, a first outgoing image 42a, a second outgoing image 42b and a third outgoing image 42c. The outgoing images 42 are each offset from one another in the scanning direction 40, such that they do not overlap in the scanning direction 40.

In other words, the three outgoing images 42 are arranged in a column from the first outgoing image 42a to the third outgoing image 42c in the scanning direction 40. The outgoing images 42 in this example are projected in identical size on the image sensor 14 such that each pixel 30 of one outgoing image 42, corresponding to a position on the object 12, matches a pixel 30 of another outgoing image 42 corresponding to the same position on the object 12. It will be appreciated that the outgoing images need not be of identical size, and that pixels 30 of one outgoing image corresponding to a position on the object, may match a group of pixels 30 of another outgoing image, corresponding to the same position on the object.

For example, in FIG. 2, the first outgoing image 42a comprises a pixel A, which matches a pixel B in the second outgoing image 42b, which matches a pixel C in the third outgoing image 42c. Pixels A, B, and C therefore correspond to the same position on the object 12 which is being imaged.

The rolling shutter image sensor 14 is configured to scan the whole frame 32 of pixels 30 by scanning each image line 34 sequentially along the scanning direction 40. In other words, it is configured to scan an image line 34, followed by the adjacent image line 34 in the scanning direction 40.

Scanning of each image line 34 includes scanning each pixel 30 in the image line 34 sequentially along the width direction 36. In other words, the image sensor 14 scans a pixel 30 in an image line 34 followed by an adjacent pixel in the image line 34 in the width direction 36.

Scanning each image line 34 includes making the pixels 30 in the respective image line 34 sensitive to light for a predetermined exposure time, and then reading out each pixel 30, as is explained in more detail with reference to FIG. 3.

Figure 3:
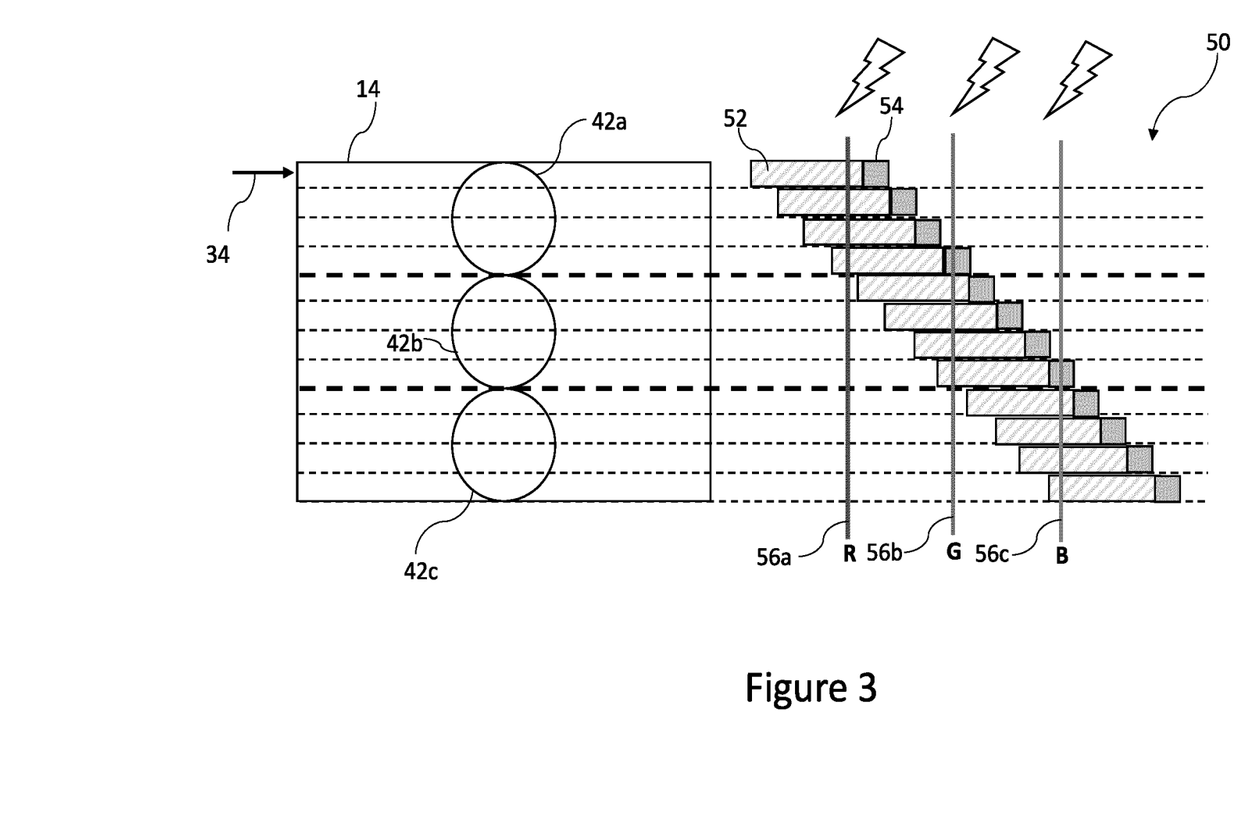
FIG. 3 shows the roller shutter image sensor according to FIG. 2 with a scanning time map.

FIG. 3 shows the image sensor 14 with the plurality of image lines 34, and the first outgoing image 42a, the second outgoing image 42b, and the third outgoing image 42c projected onto the image sensor 14. Next to the image sensor 14, a scanning time map 50 is shown. The scanning time map 50 shows the passage of time from left to right. For each image line 34, the scanning time map 50 shows an exposure time 52 followed by an intensity readout 54. In other words, once the image line 34 has been sensitive to light for the predetermined exposure time 52, the image sensor 14 is configured to readout the pixels 30 in the image line 34. Reading out the pixels 30 comprises determining an intensity for each pixel 30 of the respective image line 34, corresponding to the intensity of light received at the respective pixel 30 during the exposure time 52.

The beginning of the exposure time 52 for each image line 34 in the scanning direction 40 is offset a predetermined amount of time from the preceding image line 34, corresponding to the amount of time it takes to readout 54 an image line 34. Therefore, while each image line 34 is sensitive to light for the same amount of time, the sensitivity to light begins for each image line 34 at a different time.

Flashes of light 56 illuminate the object 12 while only the image lines 34 across which a single outgoing image 42 spans are sensitive to light. This is possible due to the staggered sensitivity of each image line 34 in the scanning direction 40. As such, the exposure time 52 for each image line 34 is equal to the time taken to read out the number of image lines 34 across which each outgoing image 42 spans. This means that, at any one time, the number of image lines 34 which are sensitive to light equals the number of image lines 34 across which each outgoing image 42 spans.

Each flash of light 56 will therefore only affect the intensity readout 54 of the image lines 34 associated with a single outgoing image 42. In this example, there are three flashes of light 56, one flash 56 corresponding to each outgoing image 42 projected onto the image sensor 14.

Referring back to FIGS. 1 and 2, the image sensing system 10 comprises a timing module 26 which is configured to control the light generator 18 to generate the different colours of light at suitable intervals, in other words to control the different lights 20 of the light generator 18 to flash at the correct time.

More specifically, in this example, the timing module 26 is configured to control the light generator 18 to generate a flash of light 56a-56c in one colour at a point when all of the image lines 34 of a single outgoing image 42 are sensitive and the image lines 34 of another outgoing image 42 are not sensitive. The timing module 26 is configured to sequentially generate another flash of light 56a-c in another colour at a point when all of the image lines 34 of another outgoing image 42 are sensitive, and the image lines 34 of other outgoing images 42 are not sensitive.

In this example, shown in FIGS. 2 and 3, during the exposure time 52 of the first four image lines 34 in the scanning direction 40, across which the first outgoing image 42a spans, the timing module 26 controls the light generator 18 to generate a flash of red light 56a.

During the exposure time of the next four image lines 34 in the scanning direction 40, across which the second outgoing image 42b spans, the timing module 26 controls the light generator 18 to generate a flash of green light 56b.

During exposure time of the last four image lines 34 in the scanning direction 40, across which the third outgoing image 42c spans, the timing module 26 controls the light generator 18 to generate a flash of blue light 56c. This is repeated for each scan of the frame 32.

Although the colours red, green and blue have been used in this order in this example, in other examples, any three colours of light may be used, and the colours of light may be flashed in any order during scanning of a frame.

The image sensing system 10 further comprises a processor 28 which is configured to identify matched pixels 30 of different outgoing images 42, such as pixels A, B and C shown in FIG. 2, which each correspond to the same position on the object 12.

The processor 28 is configured to resolve the colour spectrum of the respective position on the object 12 based on the intensity readout of the matched pixels A, B, and C, and based on which colours of light the object 12 was exposed to when the respective pixels A, B and C were sensitive, even if the image sensor 14 used is a monochrome image sensor.

For example, during the exposure (i.e. sensitivity) of pixel A, the object 12 is illuminated by the flash of red light 56a. During exposure of pixel B, the object 12 is illuminated by the flash of green light 56b. During exposure of pixel C, the object 12 is illuminated by the flash of blue light 56c. The intensity readout of pixel A will therefore correspond to the amount of red light reflected by the respective position on the object 12, the intensity readout of pixel B will correspond to the amount of green light reflected by the respective position on the object 12, and the intensity readout of pixel C will correspond to the amount of blue light reflected by the respective position on the object 12.

In this example, the colour $X_c$ of the position on the object 12 corresponding to pixels A, B and C can be determined by superposing the intensity readouts of the three matched pixels A, B and C.

$$X_c = A + B + C \qquad \text{Equation 1}$$

The processor 28 can therefore resolve the colour $X_c$ of the respective position on the object 12 corresponding to matched pixels A, B and C with Equation 1. The resolved colour $X_c$ will have a spectral resolution including the wavelengths of the three colours of light generated by the light generator 18 during scanning of the frame 32.

It will be appreciated that this superposition of intensity readouts can be used with any two or more colours of light, and that the spectral resolution of the resolved colour $X_c$ will include the wavelengths of the colours of light used to illuminate the object 12 during scanning of a frame 32.

The superposition of intensity readouts can be achieved with any number of outgoing images 42 projected onto the image sensor 14, with up to as many different colours of light flashed as there are outgoing images 42 projected onto the image sensor 14. The more colours (i.e. wavelengths) of light there are used to illuminate the object 12 for matched pixels 30 during scanning of the frame 32, the higher the spectral resolution of the resolved colour $X_c$ will be.

Sometimes, using fewer colours to illuminate the object 12 for matched pixels 30 during scanning of the frame 32 can result in a more accurate determination of the resolved colour $X_c$. For example, if there are two or more pixels 30 in a matched group of pixels 30 such as pixels A, B and C which are sensitive during illumination of the object 12 with the same colour of light, the intensity readout for these pixels 30 can be used to provide an error measure which the processor 28 can use to resolve the colour $X_c$ more accurately.

For example, if during the exposure (i.e. sensitivity) of pixel A, the object 12 is illuminated by the flash of red light, during exposure of pixel B, the object 12 is illuminated by the flash of green light, and during exposure of pixel C, the object 12 is illuminated by another flash of red light, then the spectral resolution will include the wavelengths of only the red and the green light, but the intensity readout of pixel A and C should be the same. If they are not the same, then there is an error in the readout, which can be mitigated by, for example using the average intensity of pixels A and C, as shown in Equation 2 below and superposing that with the intensity readout of pixel B.

$$X_{c1} = \frac{A+C}{2} + B \qquad \text{Equation 2}$$

Figure 4:
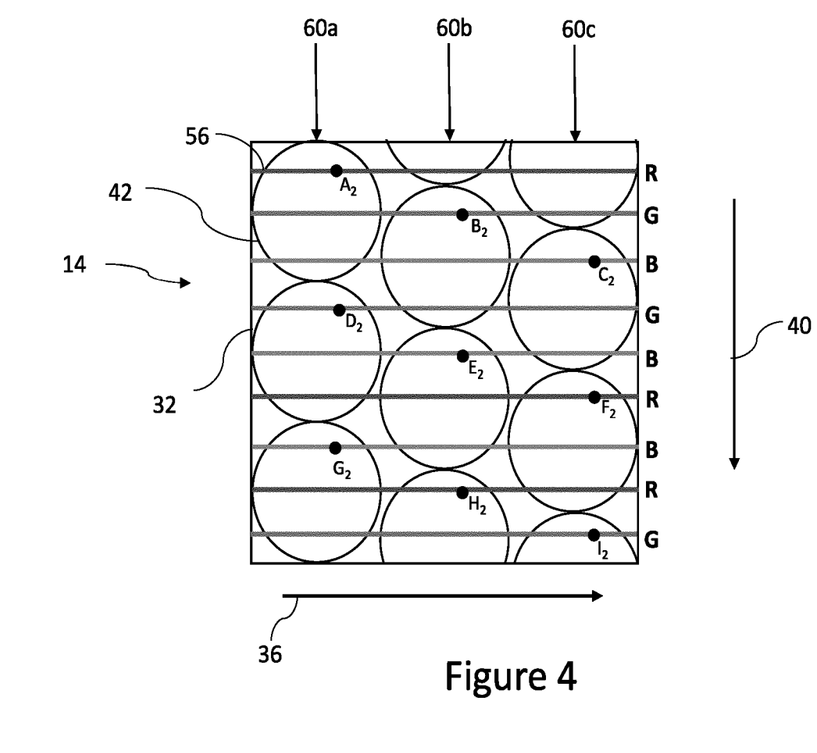
FIG. 4 schematically shows a roller shutter image sensor with images projected onto it in a second example.

FIG. 4 shows the roller shutter image sensor 14 with outgoing images 42 projected onto it in a different configuration to FIGS. 2 and 3, which makes better use of the whole frame 32 of the image sensor 14.

In this example, the lens system 16 is configured to project an array of outgoing images 42 onto the image sensor 14, in this example, nine. The nine outgoing images 42 are arranged into three columns 60 which are distributed along the width direction 36. Each column 60 comprises a total of three outgoing images 42 distributed in the scanning direction 40. In other examples, there may be two or more columns of outgoing images, and there may be two or more outgoing images in each column. The projections of the outgoing images 42 on the image sensor 14 have no overlapping parts (i.e. different outgoing images do not occupy the same space on the image sensor 14).

Each column 60 of outgoing images 42 is offset from an adjacent column 60 of outgoing images 42 in the scanning direction 40, such that in some columns, an outgoing image 42 is split across the frame 32 so that a portion of the outgoing image 42 is projected at one end (e.g. the top) of the column 60, and the remaining portion of the outgoing image 42 is projected at the other end (e.g. the bottom) of the column 60, such that the two portions in one column define a single whole outgoing image.

In this example, in a first column 60a in the width direction 36, each of the outgoing images 42 is whole. In a second column 60b in the width direction 36, the outgoing images 42 are offset in the scanning direction 40 by one third of one outgoing image 42 compared to the first column 60a. In other words, one third of a portion of an outgoing image 42 is projected at the top of the second column 60b, and the remaining two thirds of the respective outgoing image 42 is projected on the bottom of the second column 60b. In a third column 60c in the width direction 36, the outgoing images are offset in the scanning direction 40 by one third of one outgoing image 42 compared to the second column 60b. Therefore, the first column 60a is also offset by one third of one outgoing image 42 compared to the third column 60c.

This effectively increases the frame rate of the image sensor 14 nine-fold. The order of reading out each whole outgoing image 42 is the first outgoing image in the scanning direction 40 of the first column 60a, followed by the first whole outgoing image 42 in the second column 60b, followed by the first whole outgoing image 42 in the third column 60c, and continues for the second outgoing image 42 of each column 60 and so on.

The timing module 26 controls the light generator 18 to generate different colours of light at regular intervals. In this example, the intervals are spaced such that three flashes 56 of light are generated during the exposure of each image line 34. In other words, in the time taken to readout all of the image lines 34 of one outgoing image 42, the timing module 26 controls the light generator 18 to generate three flashes 56 of light. In this example, the number of intervals of flashes 56 during exposure of each image line 34 corresponds to the number of columns 60 of outgoing images 42.

In this example, there are three colours of light generated by the light generator 18; red, green and blue (R, G, B). In this example, each flash 56 of light is a different colour to the preceding flash 56 of light. It will be appreciated that in other examples, there may be two consecutive flashes of light of the same colour.

The light generator 18 in this example is configured to generate the different colours of light in cycles, where each cycle comprises three flashes 56 of light of different colours in a predetermined sequence. Each cycle has the same sequence as the preceding cycle but begins with the second colour of light of the preceding cycle and ends with the first light of the preceding cycle.

Therefore, in this example, the first cycle includes generation of light in the sequence RGB, the second cycle generates light in the sequence GBR, and the third cycle generate light in the sequence BRG. Each cycle is generated within a single frame, and in this example, there are multiple cycles generated within a single frame. In other examples, any other suitable sequence may be used, and the changes between subsequent cycles may be any suitable change.

The processor 28 identifies matched pixels in the nine outgoing images 42, corresponding to a single position on an object 12, which is represented in this example by pixels $A_2$-$I_2$. Each pixel $A_2$-$I_2$ is sensitive to light during three different flashes 56.

For each pixel, the intensity readout will correspond to the amount of light reflected by the object 12 from the coloured flashes 56. This can be represented by Equation 3 below:

$A_2=R+G+B$ $B_2=G+B+G=2G+B$ $C_2=B+G+B=2B+G$ $D_2=G+B+R$ $E_2=B+R+B=2B+R$ $F_2=R+B+R=2R+B$ $G_2=B+R+G$ $H_2=R+G+R=2R+G$ $I_2=G+R+G=2G+R$  Equation 3:

Equations $A_2$, $D_2$ and $G_2$ are the same, which leave seven equations to resolve three unknowns, R, G and B. The processor 28 can resolve these equations to determine the unknown variables, and thereby to resolve the colour $X_c$ of the position on the object 12 using Equation 1. Only three of the equations in Equation 3 are needed to solve the three unknowns, but if all of the information is used, this can reduce noise. A least square error fit can be used to solve for R, G and B most accurately.

This can be repeated for every pixel 30 to resolve the colour $X_c$ of each position of the object 12 being imaged, even with a monochrome image sensor. The spectral resolution of the resolved colour $X_c$ will be limited by the wavelengths of the colours of light which are flashed. Therefore, the more colours of light which are flashed, the higher the spectral resolution will be for the resolved colour $X_c$. There can be as many colours of light flashed as there are outgoing images 42. Therefore, with nine outgoing images 42, there could be nine different colours of light flashed, which would give 9 different equations for the matched pixels to resolve the intensities of the nine different colours.

Although it has been described that there are three columns of outgoing images projected onto the image sensor, it will be appreciated that there may be any suitable number of columns, n, of images distributed along the width direction, and that the columns may be offset from adjacent columns by 1/n of an outgoing image. This ensures that each and every outgoing image 42 which is projected onto the image sensor will be offset from each and every other outgoing image 42, such that no two outgoing images 42 will be exposed to light at identical times.

The resolved colour $X_c$ of the object 12 can therefore be determined after readout of each frame 32, using matched pixels for the whole frame 32, such that the colour resolution has a frame rate equal to the frame rate of the image sensor 14. However, the resolved colour $X_c$ of the object 12 could also be determined after readout of each matched pixel 30, if the readout of the previous eight matched pixels are used on a rolling basis. For example, when the intensity readout of pixel $E_2$ is carried out, the intensity readout of pixel $E_2$, together with the intensity readout of pixel $A_2$-$D_2$ of the same frame 32, and the intensity readouts of pixels $F_2$-$I_2$ of the previous frame 32 can be used to resolve the colour $X_c$ of the object 12 at the position corresponding to pixel $E_2$. This increases the effective frame rate of the colour resolution by the number of outgoing images 42 projected onto the image sensor 14, in this case, nine-fold.

In an example in which the lights are configured to generate continuous light (i.e. continuous illumination), back-to-back, rather than flashes of light, the equation for intensity for each pixel will differ slightly. For example, for a pixel Z, the intensity of light received while the pixel is sensitive will be based on the proportion of time that the pixel was exposed to each colour of light while it was sensitive, such as:

$Z=t_1R+t_2G+t_3B$ where $t_1+t_2+t_3=1$.

In a similar manner to the example described above, each matched pixel would have a corresponding equation, and provided there are as many different equations for the matched pixels as there are different colours of light, the processor can resolve the colour of the position of the object to which the matched pixel corresponds with these equations.

Having multiple outgoing images 42 projected onto the image frame, and multiple intervals of light generation during scanning of a single frame 32, means that there is a higher frequency of light change than, for example, having only one interval of colour light generation during scanning of the frame. Having such high frequency light colour changes means that the light changes become less visible to the user, eventually perceived by the user only as a continuous light, rather than rapid flashing lights.

Figure 5A:
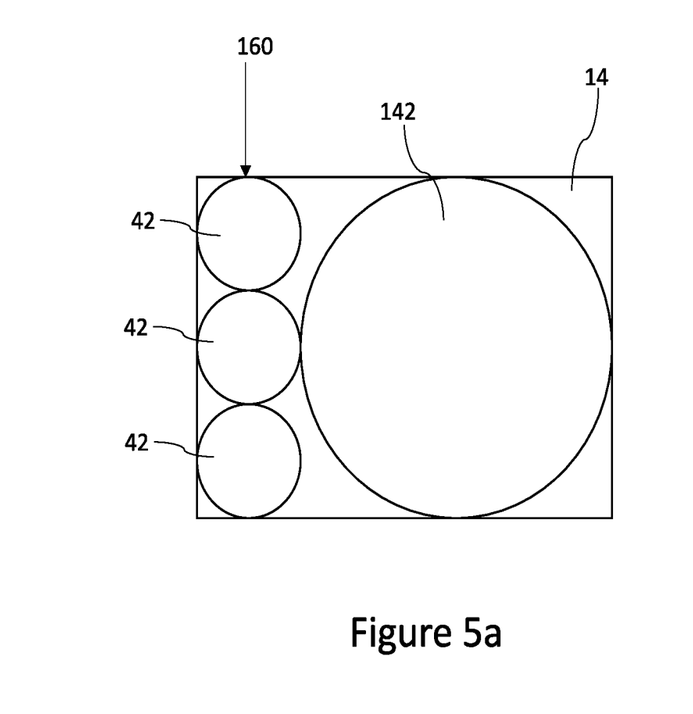
FIGS. 5a and 5b show a roller shutter image sensor with images projected onto it in a third and fourth example respectively.
Figure 5B:
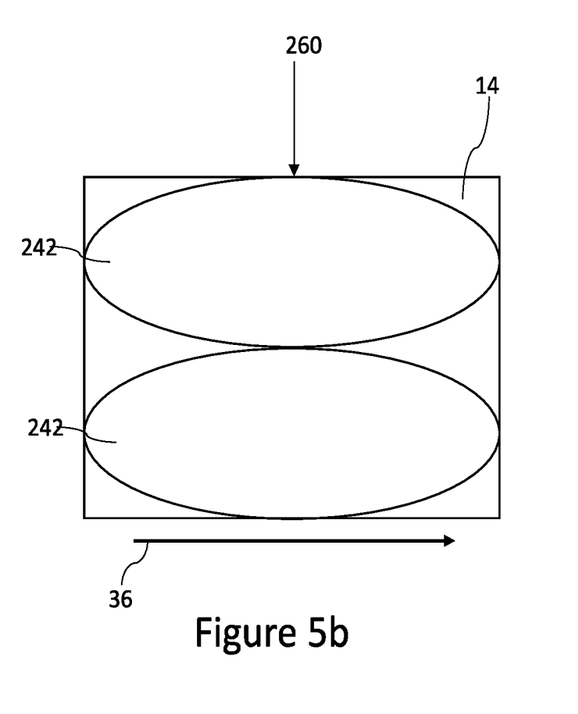

FIGS. 5a and 5b show third and fourth examples respectively of projections of outgoing images 42 onto an image sensor 14.

In FIG. 5a, there are three outgoing images 42 projected in a column 160 in a similar manner to the first column 60a of FIG. 4, and one larger outgoing image 142 projected onto the remaining space of the image sensor 14. Such an arrangement may be useful if it is desirable to have a high frame rate at a lower spatial resolution for some features, and a higher spatial resolution at a lower frame rate for others. The larger outgoing image 142 would therefore provide a higher spatial resolution than the column 160 of outgoing images 42, but in order to determine the colour of each pixel, the frame would have to be scanned several times, and it would have to be ensured that each pixel of the larger outgoing image 142 was exposed to different colours of light in each subsequent scan of the frame 32.

In FIG. 5b, there are two outgoing images 242 projected in a column 260 onto the image sensor 14, where the projected images have been stretched in the width direction 36 to cover as much of the image sensor 14 as possible. This increases the horizontal resolution of the outgoing images 242.

Figure 6:
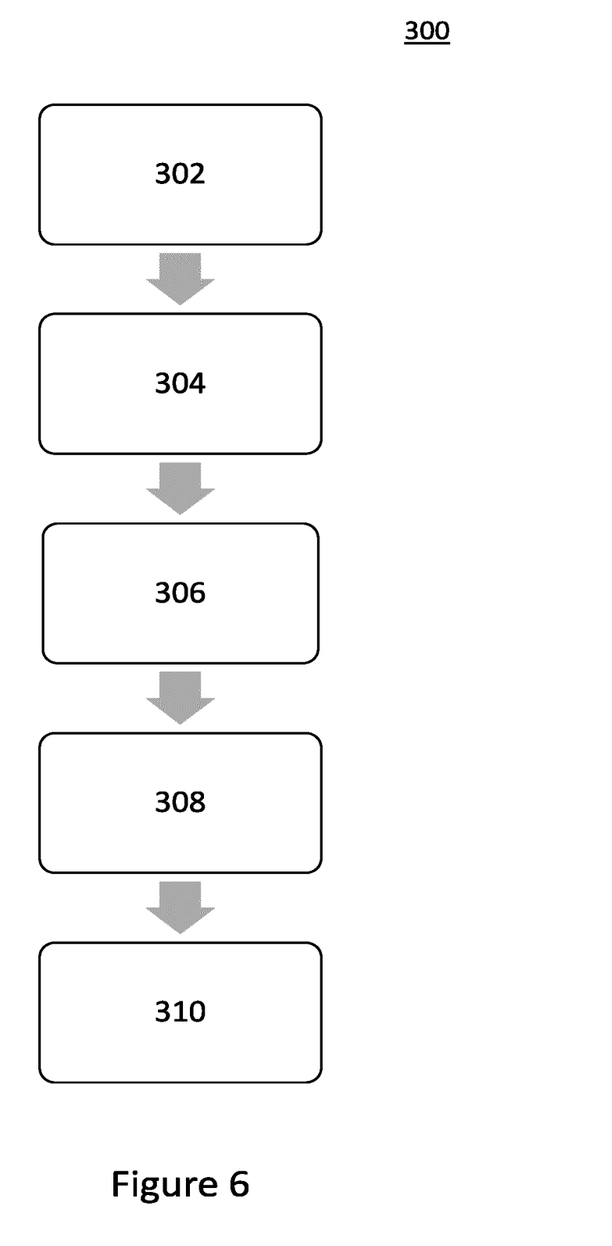
FIG. 6 is a flow chart showing steps of a method for resolving colour of an image.

FIG. 6 is a flow chart showing a method 300 of resolving the colour of the object 12 with the rolling shutter image sensor 14. The method 300 starts with block 302 to project at least two outgoing images 42, 142, 242 onto the image sensor 14 offset from one another along the scanning direction, such as shown in FIGS. 2-5. Within the outgoing images 42, 142, 242 each pixel 30 of the outgoing images 42, 142, 242 matches another pixel 30 or group of pixels of another outgoing image 42, 142, 242 and corresponds to a position on the object 12.

In block 304, the method 300 includes sequentially generating at least two different colours of light having different wavelengths, to illuminate the object 12. The light generation may be controlled to be generated in intervals, for example as described with reference to FIGS. 2 and 3, and FIG. 4.

In block 306, the method 300 includes scanning pixels 30 of the image sensor 14 to obtain an intensity readout for each pixel 30. In this example, the exposure time of each image line 34 of the image sensor 14 is equal to the time taken to readout the number of image lines 34 across which each of the outgoing images 42 spans.

In block 308, the method 300 includes identifying matched pixels of different outgoing images 42, 142, 242, corresponding to a position on the object 12, and block 310 includes resolving the colour spectrum $X_c$ of the position on the object 12 based on the intensity readout of each matched pixel 30, and the colours of light that the respective pixels 30 were exposed to while they were sensitive to light.

It will be appreciated that all of the blocks 302-308 can be carried out at the same time.

Although it has been described that the timing module controls the light generator to generate different colours of light at regular intervals, the intervals need not be regular, as a processor could resolve the colours with irregular intervals of light generation as well.

Further, it has been described that the processor identifies matched pixels in different outgoing images. The matched pixels may be predetermined based on the lens system, or could be calculated in real-time by processing the outgoing images and comparing the pixels from one outgoing image to the pixels of another outgoing image. It will be apparent that the accuracy of the colour resolution may be impacted by motion of the object during scanning. The less motion during scanning the better the colour resolution of each point on the object. Using a processor to compare pixels in real-time to determine matched pixels may allow for some compensation of motion during scanning.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An image sensing system comprising:
   a rolling shutter image sensor comprising an array of pixels in a frame arranged into a plurality of image lines extending along a width direction, and distributed in a scanning direction which is perpendicular to the width direction, wherein the rolling shutter image sensor is configured to scan the frame by sequentially scanning each image line along the scanning direction, wherein scanning each image line includes making the pixels in each image line sensitive to light for a predetermined exposure time, and then determining an intensity readout for each pixel of the respective image line;
   a lens system configured to project an array of similar outgoing images of an object onto the image sensor, the array comprising at least two distinct columns of outgoing images, wherein the columns are distributed along the width direction, each column comprising at least two outgoing images distributed in the scanning direction, each of the outgoing images offset from all other outgoing images in the scanning direction, wherein the outgoing images are projected onto the image sensor such that each pixel of an outgoing image corresponding to a position on the object matches a pixel or group of pixels of another outgoing image corresponding to the respective position on the object;
   a light generator configured to generate at least two different colours of light, defined by different wavelengths, to illuminate the object;
   a timing module configured to control the light generator to sequentially generate at least two different colours of light during scanning of a single frame; and
   a processor configured to identify matched pixels of different outgoing images corresponding to a respective position on the object, and to resolve the colour of the respective position of the object based on the intensity readout of each matched pixel and the colours of light that the respective matched pixels were exposed to while they were sensitive.

2. An image sensing system according to claim 1, wherein the exposure time of each image line is equal to the time taken to read out the number of image lines across which each outgoing image spans.

3. An image sensing system according to claim 1, wherein the timing module is configured to control the light generator to generate different colours of light at intervals, such that the light generator is controlled to generate at least two different colours of light during the intensity readout of image lines of at least one of the outgoing images in a frame.

4. An image sensing system according to claim 3, wherein the light generator is configured to sequentially generate the different colours of light in cycles, each cycle being generated within a frame and comprising generation of the different colours of light in a predetermined sequence, wherein each subsequent cycle has the same sequence as a preceding cycle but begins with the second colour of light of the preceding cycle and ends with the first colour of light of the preceding cycle.

5. An image sensing system according to claim 1, wherein the timing module is configured to control the light generator to generate light at intervals, such that there are as many intervals during the scanning of each outgoing image as there are columns of outgoing images projected onto the image sensor.

6. An image sensing system according to claim 1, wherein the light generator is configured to produce flashes of light or to produce a continuous emission of light.

7. An image sensing system according to claim 1, wherein the processor is configured, for readout of each and every pixel, to resolve the colour spectrum of the respective position of the object based on the intensity readout of the respective pixel and at least one preceding matched pixel.

8. A method of resolving the colour of an object with a rolling shutter image sensor comprising an array of pixels in a frame arranged into a plurality of image lines extending along a width direction, and distributed in a scanning direction which is perpendicular to the width direction, wherein the rolling shutter image sensor is configured to scan the frame by sequentially scanning each image line along the scanning direction, wherein scanning each image line includes making the pixels in each image line sensitive to light for a predetermined exposure time, and then determining an intensity readout for each pixel of the respective image line, the method comprising:
   projecting an array of similar outgoing images onto the image sensor in at least two distinct columns of outgoing images, wherein the columns are distributed along the width direction, each column comprising at least two outgoing images distributed in the scanning direction, wherein the outgoing images are each offset from all other outgoing images along the scanning direction, wherein each pixel of an outgoing image corresponding to a position on the object matches a pixel or a group of pixels of another outgoing image corresponding to the respective position on the object;

sequentially generating at least two different colours of light, defined by different wavelengths, to illuminate the object during scanning of the frame of the image sensor;

identifying matched pixels of different outgoing images corresponding to a respective position on the objection, and resolving the colour of the respective position of the object based on the intensity readout of each matched pixel in the outgoing image and the colours of light that the respective matched pixels were exposed to while they were sensitive.

9. A method according to claim 8, wherein the exposure time is equal to the time taken to readout the number of image lines across which each outgoing image spans.

10. A method according to claim 8, wherein different colours of light are generated at intervals, such that at least two different colours of light are generated during the intensity readout of image lines of at least one of the outgoing images in a frame.

11. A method according to claim 10, wherein different colours of light are generated sequentially in cycles, each cycle being generated within a frame and comprising generation of the different colours of light in a predetermined sequence, wherein each subsequent cycle has the same sequence as a preceding cycle but begins with a second colour of light of the preceding cycle and ends with a first colour of light of the preceding cycle.

12. A method according to claim 11, wherein different colours of light are generated at intervals, such that there are as many intervals during scanning of each outgoing image, as there are columns of outgoing images projected onto the image sensor.

13. A method according to claim 8, wherein generating light includes generating a flash of light, or generating a continuous light.

\* \* \* \* \*